May 6, 1941.  J. B. LOKKEN  2,240,657

SAFETY TRACTOR HITCH

Filed Feb. 24, 1940

Inventor

J. B. Lokken

By Watson E. Coleman

Attorney

Patented May 6, 1941

2,240,657

UNITED STATES PATENT OFFICE 2,240,657

SAFETY TRACTOR HITCH

Julius B. Lokken, Vining, Minn.

Application February 24, 1940, Serial No. 320,708

2 Claims. (Cl. 180—14.5)

This invention relates to improvements in tractor hitches and pertains particularly to an improved safety hitch.

In the operation of farm tractors in connection with various types of farm machinery, it frequently occurs that such machinery, especially plows and the like, comes into engagement with a rock or some other fixed object in the ground and unless provision is made for immediately stopping the machine, damage will be done. Some types of hitches for tractors used for drawing such farm machinery over the ground, provide for the release of the machine from the tractor, but this arrangement, while saving the machine from damage, is not entirely satisfactory because of the fact that the operator of the tractor sometimes proceeds to a considerable distance before discovering that the machine has been disconnected and even though he may discover this immediately, it is difficult for him to back up the tractor to the machine and reconnect the same without assistance.

The present invention has for its primary object to provide a novel and improved tractor hitch by means of which a resilient coupling is provided between the machine and the tractor so that shocks and vibrations received by the draft machine will not be transferred to the tractor or vice versa, and by means of which also, when an excessive strain is applied to the hitch as in the case of the draft machine being stopped by striking a fixed object, the tractor clutch mechanism will be thrown out of engagement so that the tractor, as well as the draft machine, will be stopped without the hitch being uncoupled.

A further object of the invention is to provide a safety hitch of the character above stated, which is of relatively simple construction and which may be attached to a standard tractor without having to change the arrangement or location of any of the parts thereof in association with which it is designed to operate.

Still another object of the invention is to provide a safety hitch of the character stated in which the construction and arrangement of the parts is such that the operator of the tractor can recouple or re-engage certain parts thereof for re-applying the tractor clutch after the obstruction has been removed and it is desired to proceed with the operation of the tractor and draft machine.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

Figure 1:
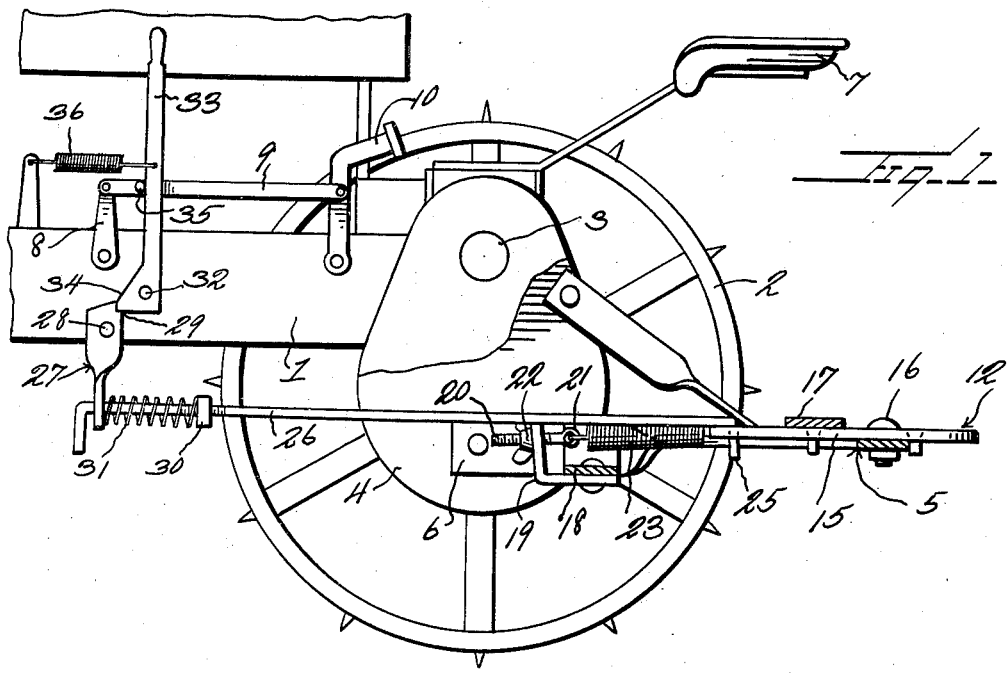
Fig. 1 is a view partly in side elevation and partly broken away of a conventionally illustrated tractor showing the mechanism embodying the present invention applied thereto.
Figure 2:
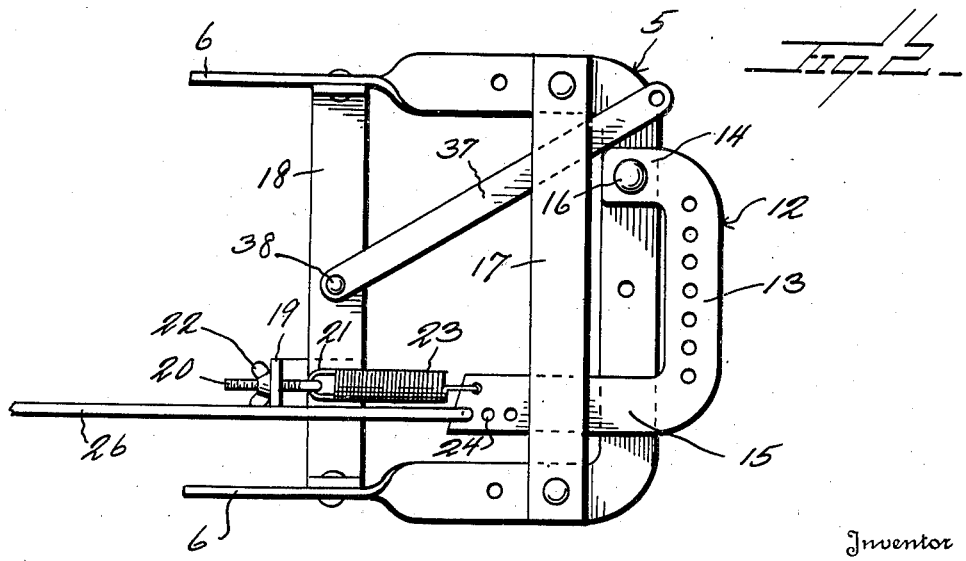
Fig. 2 is a view in plan of the auxiliary hitch and its mounting on the standard tractor hitch.

Referring now more particularly to the drawing, the numeral 1 designates a conventionally illustrated body portion of a tractor of a standard type or make, having between the rear wheels 2 a transverse axle housing 3, and having attached to a gear housing 4 upon the inner side of each wheel, a fixed hitch bar which is in the form of a flat substantially U-shaped yoke 5, the ends of the side legs 6 of which are connected to the gear housings 4 so as to support this yoke horizontally and projecting rearwardly from the tractor.

The rear of the tractor body 1 supports the usual driver's seat 7 and the numeral 8 designates a clutch operating lever which is coupled by a connecting rod 9 with a foot lever 10, which is disposed in a location convenient to the driver so that he may use his foot in the operation of the clutch. The lever 8 will be controlled by the usual clutch control springs, not shown, which are housed within the body or housing 1, so that when the pedal 10 is released under normal working conditions, the clutch will be automatically engaged.

The parts thus far described are all standard on various types of tractors.

In carrying out the present invention, there is provided an auxiliary hitch bar indicated generally by the numeral 12 and having substantially the form of the letter J. This bar is prepared from flat bar material and has a yoke portion 13, the short leg 14 and the longer leg 15, and the auxiliary hitch is disposed over the top of and on the rear part of the main hitch 5 in the manner shown, a bolt or other suitable means 16 pivotally coupling the end of the short leg with the hitch 5. The end of the longer leg 15 of the auxiliary hitch extends forwardly beneath a guide bar 17 which is secured transversely of the standard hitch 5 and at the rear of the standard hitch there is secured transversely thereof in spaced parallel relation with the guide bar 17, a cross brace bar 18.

The bar 18 has attached thereto in alinement with the long leg 15 of the auxiliary hitch, the upstanding bracket plate 19 through which extends the threaded shank 20 of an eye bolt 21. At the rear of the bracket 19, the eye bolt shank receives a wing nut or other suitable type of nut 22 which bears against the bracket.

The eye of the eye bolt 21 is coupled with the rear end of the long leg of the auxiliary hitch by a relatively strong spring 23 and this spring takes the strain of the pull applied to the hitch, yielding only when such strain becomes excessive to the point where it might result in damage to the draft machine if some part of the latter has come in contact with a fixed obstruction in the ground.

The yoke portion of the auxiliary hitch is provided with a number of apertures 23 for facilitating the attachment of the hitch to the pull tongue or clevis of the draft machine.

At the forward end of the long leg 15 of the auxiliary hitch, a number of apertures are formed in a line extending longitudinally of the leg, as indicated at 24, and in one of these apertures there is connected the hooked end 25 of a pull rod or pull link 26. This pull rod extends forwardly and at its forward end passes loosely through the lower end of a hanging latch 27 which is pivotally attached, as at 28, to an adjacent part of the tractor body. The upper end of this latch is provided with the notch 29 for the purpose hereinafter stated. The rod 26 carries a fixed collar 30 between which and the adjacent latch 27 an expansion spring 31 is located. This spring functions to return the latch to a position, after it has been shifted in the manner hereinafter stated, where it may be re-engaged by the adjacent pivoted lever.

Pivotally secured to the side of the tractor body 1, as at 32, is the lower end of a trip lever 33 which extends upwardly across the operating link 9 which couples the clutch lever 8 with the foot lever 10. The lower end of this lever has a tongue 34 which engages in the notch 29 of the latch 27 while the forward side of the trip lever extends across and engages a pin 35 carried by the link 9.

Coupled with the trip lever 33 is a spring 36 which is here shown as being of the contractile type and extending forwardly to a suitable fixed member on the tractor body so as to normally urge the lever 33 to move forwardly, but it will, of course, be apparent that any other suitable resilient means may be employed for urging this movement of the lever. When moved in this direction, the lever pushes against the pin 35 carried by the link 9 and tends to shift the clutch control lever to the position where the clutch is disengaged, but this movement of the lever 33 under the urge of the control spring is resisted or prevented while the mechanism is in normal operating position, by the latch 27.

In the operation of the present mechanism, when a draft machine is connected with the auxiliary hitch bar 12 and is being drawn along over the ground, any shocks or jars received by such machine will be absorbed by the hitch spring 23 instead of being transmitted to the body of the tractor, but if the draft machine should encounter some fixed object so that continued pull upon the draft machine may result in damage to a part thereof, the spring 23 will yield under sufficient force and this will impart a rearward pull to the trip rod 26 so as to oscillate the latch 27. This will release the tongue 34 at the lower end of the tripping lever 33 and permit the spring 36 to pull the trip lever forwardly and thus actuate the clutch lever 8 for the disengagement of the clutch and the stopping of the tractor as well as the draft machine. Thus the draft machine will be stopped without being disconnected from the tractor.

Where an increased or decreased tension of the spring 23 may be desirable, such change of tension can be accomplished by means of the thumb nut 22 to draw forward upon or to release for rearward movement the threaded eye bolt 21.

It will, of course, be obvious that the spring 36 will have to be of greater strength or under greater tension than the control spring for the clutch so that when the finger 34 is released, the spring 36 can overcome the clutch spring and pull the lever 8 forwardly to disengage the clutch.

The cross brace bar 18 has secured thereto upon the longitudinal center of the draft device and of the tractor to which such device is attached, a swinging drawbar 37, such attachment being of a pivotal nature as indicated at 38, so that the draw bar may swing across the yoke portion of the tractor bar 5. This is to facilitate the turning of the drawn vehicle after the latter has been detached from the safety bar 12.

What is claimed is:

1. A safety hitch for a tractor having a rear hitch bar including a horizontal portion extending transversely of the tractor, the tractor having a shiftable clutch control member, comprising a substantially J-shaped auxiliary hitch bar having an apertured yoke portion and horizontally disposed long and short legs, said legs being disposed across and supported upon the said horizontal portion of the first hitch bar, a pivotal coupling between the shorter leg of the auxiliary hitch and the first bar, a bracket supported at the forward part of the first hitch bar, a threaded eye bolt extending through said bracket and carrying a nut on one end engaging the bracket, a spring coupling the eye bolt at its other end with the end of the long leg of the auxiliary hitch, a lever pivotally supported upon the body of the tractor adjacent said clutch control member, a bar connected with the clutch control member and carrying a pin engaging one side of the lever, resilient means normally urging the lever against said pin to effect the movement of the bar and the clutch control member in a direction to release the clutch, a latch pivotally supported upon the tractor body, a tongue carried by the lever and coupling the lever with said latch, the latch normally holding the lever against movement by said resilient means, and a pull rod connecting said latch with the said long end of the auxiliary draft bar effecting movement of the latch and the release of said lever upon rearward movement of the auxiliary bar.

2. A safety hitch for a tractor having a rear hitch bar, including a horizontal portion extending transversely of the tractor, the tractor having a shiftable clutch control member, comprising a substantially J-shaped auxiliary hitch bar having an apertured yoke portion and horizontally disposed long and short legs, said legs being disposed across and supported upon the said horizontal portion of the first hitch bar, a pivotal coupling between the shorter leg of the auxiliary hitch and the first bar, a bracket supported at the forward part of the hitch bar, a threaded eye bolt extending through said bracket and carrying a nut on one end engaging the bracket, a spring coupling the eye bolt at its other end with the end of the long leg of the auxiliary hitch, a lever pivotally supported upon the body of the tractor adjacent said clutch control member, a bar connected with the clutch control member and carrying a pin engaging one side of the lever, resilient means normally urging the lever against said pin to effect the movement of the bar and the clutch control member in a direction to release the clutch, a latch pivotally supported upon the tractor body, a tongue carried by the lever and coupling the lever with said latch, the latch normally holding the lever against movement by said resilient means, and a pull rod connecting said latch with the said long end of the auxiliary draft bar and effecting movement of the latch and the release of said lever upon rearward movement of the auxiliary bar, and a spring carried by the pull rod and secured at one end thereto and having its other end connected with the latch nad constantly urging the latch in a direction to engage said finger.

JULIUS B. LOKKEN.